United States Patent [19]

Das et al.

[11] Patent Number: 5,111,352
[45] Date of Patent: * May 5, 1992

[54] THREE-POLE MAGNETIC HEAD WITH REDUCED FLUX LEAKAGE

[75] Inventors: Shyam C. Das, Sudbury; Michael L. Mallary, Berlin, both of Mass.

[73] Assignee: Digital Equipment Corporation, Maynard, Mass.

[*] Notice: The portion of the term of this patent subsequent to Dec. 5, 2006 has been disclaimed.

[21] Appl. No.: 369,833

[22] Filed: Jun. 22, 1989

Related U.S. Application Data

[63] Continuation-in-part of Ser. No. 79,117, Jul. 29, 1987, Pat. No. 4,907,113, and a continuation-in-part of Ser. No. 253,390, Oct. 4, 1988, Pat. No. 4,885,649, which is a continuation of Ser. No. 33,446, Apr. 1, 1987, abandoned.

[51] Int. Cl.[5] .................... G11B 5/127; G11B 5/147
[52] U.S. Cl. ............................ 360/113; 360/126
[58] Field of Search ............ 360/113, 112, 125, 126

[56] References Cited

U.S. PATENT DOCUMENTS

| 3,921,217 | 11/1975 | Thompson | 360/113 |
|---|---|---|---|
| 4,644,432 | 2/1987 | Heim | 360/126 |
| 4,698,711 | 10/1987 | Vinal | 360/113 |
| 4,700,252 | 10/1987 | Muraoka et al. | 360/113 |
| 4,727,643 | 3/1988 | Schewe et al. | 360/119 |
| 4,734,644 | 3/1988 | Imakoshi et al. | 360/113 |
| 4,748,525 | 5/1988 | Perlov | 360/110 |
| 4,750,072 | 6/1988 | Takagi | 360/126 |
| 4,754,354 | 6/1988 | Jeffers | 360/113 |
| 4,797,766 | 1/1989 | Enz | 360/113 |
| 4,803,580 | 2/1989 | Mowry | 360/113 |
| 4,816,947 | 5/1989 | Vinal et al. | 360/113 |
| 4,825,318 | 4/1989 | Hoo et al. | 360/126 |
| 4,828,966 | 5/1989 | Mallary et al. | 360/112 |
| 4,885,649 | 12/1989 | Das | 360/113 |
| 4,891,725 | 1/1990 | Mowry | 360/113 |
| 4,907,113 | 3/1990 | Mallary | 360/112 |
| 4,912,584 | 3/1990 | Mallary et al. | 360/126 |
| 4,935,832 | 6/1990 | Das et al. | 360/112 |

FOREIGN PATENT DOCUMENTS

| 0154005 | 9/1985 | European Pat. Off. | 360/113 |
|---|---|---|---|
| 5647470 | 10/1982 | Japan . | |
| 61-48116 | 3/1986 | Japan | 360/113 |
| 2149186 | 6/1985 | United Kingdom | 360/113 |

OTHER PUBLICATIONS

Vinal, (IBM Technical Disclosure Bulletin, vol. 26, No. 7B, Dec. 1983).

*Primary Examiner*—Aristotelis Psitos
*Assistant Examiner*—Jefferson Evans
*Attorney, Agent, or Firm*—Fish & Richardson

[57] ABSTRACT

A magnetic recording head including a read pole disposed in a gap between a pair of write poles, and a sensor spaced away from the gap, the read pole adapted to conduct flux to the sensor, each write pole forming a respective cavity between itself and the read pole where the outside of at least one pole is tapered down toward the pole tip, the poles being closer together at their tips than they are near the sensor.

14 Claims, 2 Drawing Sheets

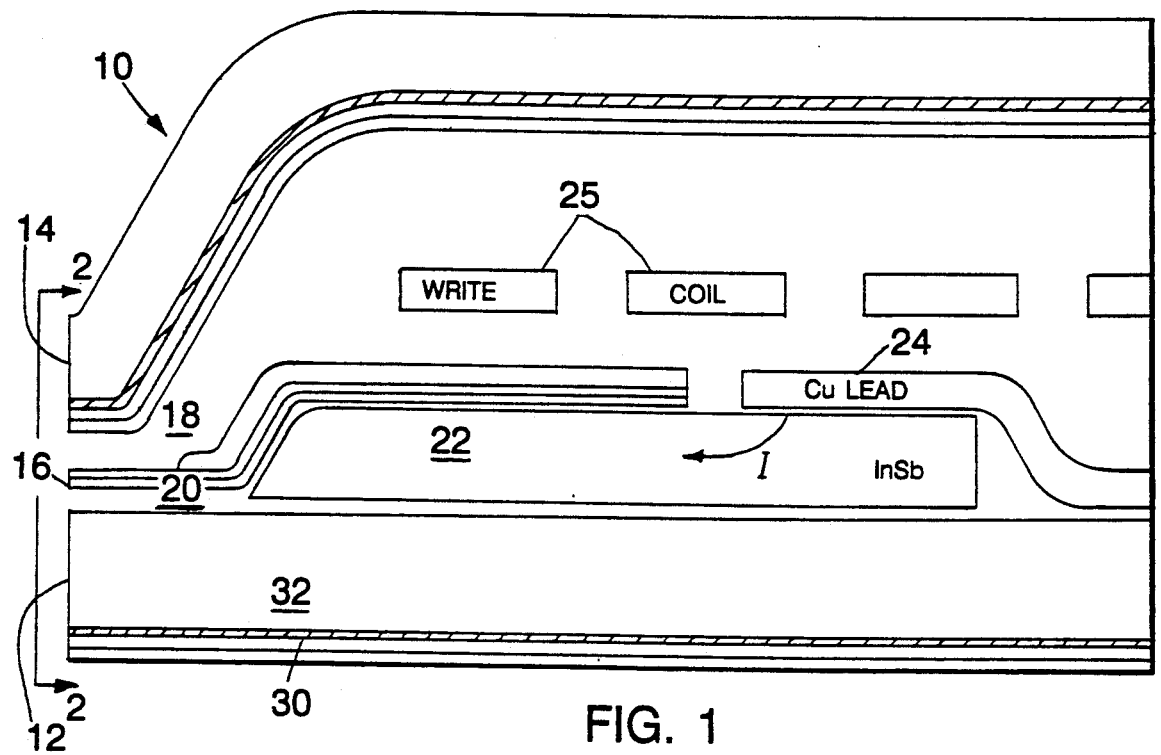
FIG. 1
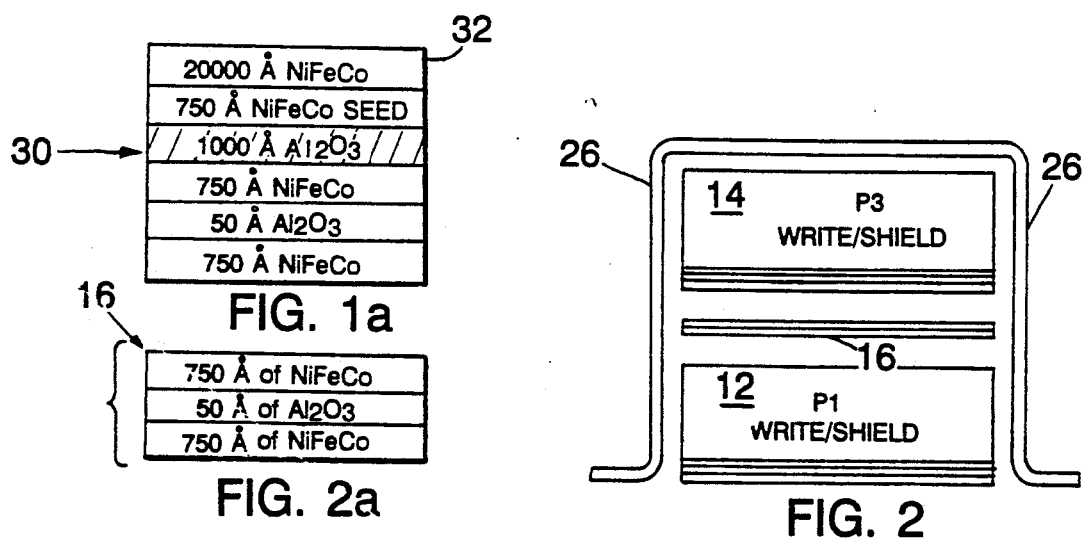
FIG. 1a
FIG. 2a
FIG. 2

000

THREE-POLE MAGNETIC HEAD WITH REDUCED FLUX LEAKAGE

BACKGROUND OF THE INVENTION

This is a Continuation-In-Part of U.S. Serial No. 07/079,117, filed Jul. 29, 1987, now U.S. Pat. No. 4,907,113; and of U.S. Ser. No. 07/253,390, filed Oct. 4, 1988, now U.S. Pat. No. 4,885,649; the latter of which being a continuation of abandoned U.S. Ser. Number 07/033,446, filed Apr. 1, 1987, all assigned to a common assignee, the specifications of which are incorporated herein by reference. This invention relates to a three-pole magnetic recording head having an MR sensor on the read pole, spaced away from the gap.

Both perpendicular and longitudinal recording techniques are used for recording and reading back data stored in a magnetic medium. In perpendicular recording the prior art consists mainly of monopole read-write heads on soft underlayer media or two-pole heads with and without soft underlayers. Both such heads have low write field gradients. It is known that low field gradients can be ameliorated by a shielded write pole. Prior approaches also suffer from relatively wide readback pulse widths. In longitudinal recording the prior art consists of two-pole heads and MR (magneto-resistive) heads with an MR element in the gap between the two poles. Having an MR element in the gap, however, imposes geometric constraints on track width.

SUMMARY OF THE INVENTION

The magnetic recording head according to the invention includes a read pole disposed in a gap between a pair of write poles. The read pole conducts flux to a remotely located flux sensor. The flux sensor may be an MR (magneto-resistive), Hall, or inductive sensor.

In a preferred embodiment, the sensor includes side shields and the read and write poles are laminated. The read pole laminant includes a thin nonmagnetic layer disposed between magnetic layers.

The magnetic recording head has optimized read and write properties with fewer process steps than would be required if separate read and write heads were utilized. The head is capable of both perpendicular and longitudinal read/write from single architecture and provides a high write field gradient in perpendicular write (narrow written transitions). The large write gap coupled with the small read gap in longitudinal read/write gives high overwrite and good readback resolution. The laminated read pole provides good domain structure at narrow track widths. An important aspect of the invention is the remote readback sensor location which makes track width independent of sensor length for narrow track sensor optimization. In the track width direction, the write wide, read narrow aspect of the three-pole invention minimizes the effect of spindle runout and inter-track interference. In the bit direction, wider effective write gap and narrower effective read gap yields higher overwrite field and slimmer readback pulse. Narrow readback pulses result in high linear bit density. The flexibility of the architecture of the head allows for the use of either inductive, Hall, or MR sensors to detect the signal on the read pole.

The readback resolution of the head is high relative to a two-pole head. For the same effective gap a two-pole flux sensing head would get 18% resolution as compared to 70% resolution for the three-pole head of the invention. The signal strength of the head at higher densities is high as compared with an equivalent two-pole head. In particular, the gain in signal strength at the highest operating frequency is approximately a factor of four. Because the signal from the three-pole head does not need to be differentiated as is the case with two-pole heads, less signal processing noise is induced. The gain in signal combined with the reduction in noise give a net signal-to-noise gain of about ×7. The three-pole head also optimizes the write process both for longitudinal and perpendicular recording. For longitudinal recording, the relatively large write gap gives high overwrite and for perpendicular recording the shielded pole give narrow written transitions.

A preferred method of forming a three-pole MR head includes forming a cavity in an alumina base layer, the base layer formed over an ALSIMAG or other substrate; the pole piece is formed entirely over the cavity and also beyond the cavity at least in the neck region and back closure region. Next, alumina is deposited to fill the cavity and is planarized. Thereafter, an MR bias conductor may be formed (unless the bias is to be otherwise supplied). The MR element and its leads are next formed with suitable insulation if needed. P2 is next formed, preferably laminated.

Furthermore, in practice of the present invention, in a magnetic three pole head with a sensor spaced away from the gap, the read pole adapted to conduct flux to the sensor, each write pole forming a respective first or second spacing structure between itself and the read pole, the active portion of the sensor can be formed upon the second spacing. The poles, at least in the middle of the head, can thus be separated from the sensor and read pole to minimize flux shunting. Alternatively, the active portion of the sensor can be formed over the first pole, and, at least in an area of the head where pole proximity would cause flux to bypass the sensor, the poles can be configured separated from the read pole to minimize flux shunting. The sensor could be MR, Hall, or inductive.

BRIEF DESCRIPTION OF THE DRAWING

FIG. 1 is a cross-sectional view of a recording head using a Hall sensor;

FIG. 1a is a schematic illustration of ferromagnetic laminated seed layers for write poles;

FIG. 2 is a cross-sectional view taken along the line 2—2 of FIG. 1;

FIG. 2 is a schematic illustration of a laminated ferromagnetic seed layer for the read pole;

DESCRIPTION OF THE PREFERRED EMBODIMENT

Figure 3:
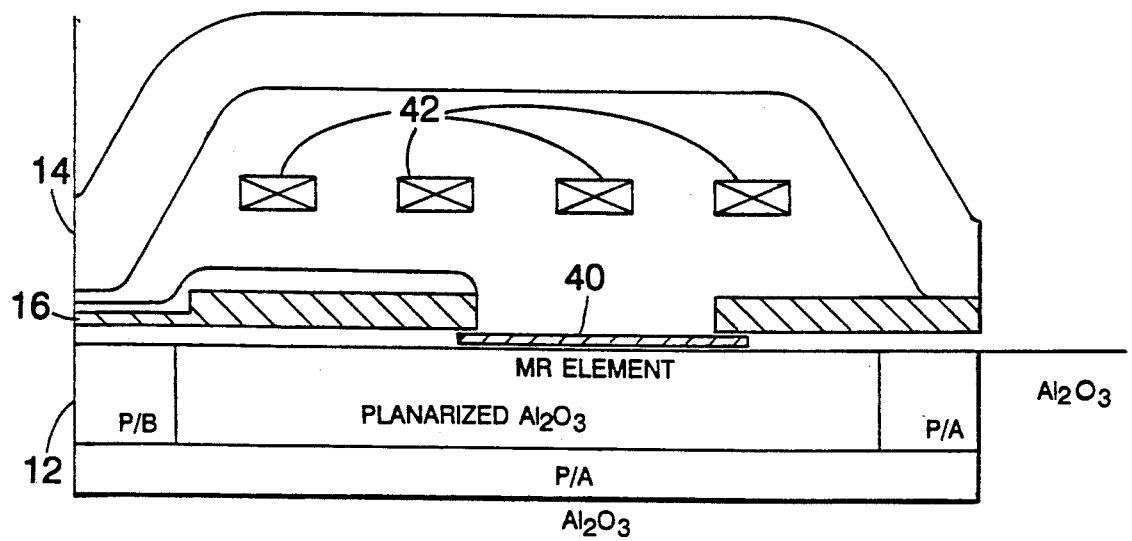
FIG. 3 is a cross-sectional view of the invention employing a MR flux sensing element.

With reference first to FIG. 1, a three-pole head 10 suited for longitudinal recording includes write poles 12 and 14 and a read pole 16. The write poles 12 and 14 are separated from the read pole to form gaps 18 and 20. The read pole 16 conducts magnetic flux to a Hall sensor 22 which is made of indium antimonide. The Hall sensor 22 is connected to a copper lead 24 which provides some current. Leads to conduct an electrical signal from the Hall sensor 22 to electronics are not shown. A write coil 25 is provided for writing in conjunction with the write poles 12 and 14. As shown in FIG. 2, a saturable side shield 26 is provided to suppress adjacent track fringing interference during read. The shield 26 saturates during write and is therefore effectively not present. The shield 26 is thin, having a thickness of approximately three microinches.

In one embodiment, the recording head 10 is made in the following way. The write pole 12 begins with a laminated seed layer structure 30, the details of which are shown in FIG. 1a. A 50 Angstrom thick layer of $Al_2O_3$ is disposed between 750 Angstrom layers of NiFeCo. The next layer is 1,000 Angstrom $Al_2O_3$ followed by a 750 Angstrom layer of NiFe or NiFeCo. The seed layer structure 30 provides narrow track domain control. A 20,000 Angstrom thick layer of NiFe or NiFeCo 32 is deposited over the seed layer structure 30 by through mask plating or sheet vacuum deposition followed by ion milling to leave the write pole 12. The indium antimonide Hall element 22 is next formed. The read pole 16 is formed by depositing another laminated ferromagnetic seed layer structure as shown in FIG. 2a along with a yoke structure that connects to the Hall sensor 22. The structure is ion milled to form the read pole 16. A non-magnetic buffer layer 19 (e.g., hard bake photoresist) is deposited over the read pole 16 to minimize the leakage of flux from the read pole 16. The write coil 25 is formed at this time, and is insulated by another insulation layer. Another magnetic seed layer laminate structure 30 as shown in FIG. 1a is next deposited in order to form the other write pole 14. The pole 14 works with the pole 12 during write and shields the read pole 16 (with the help of the pole 12) during read. A thin ceramic layer (not shown) is deposited over the recording head 10 over which is deposited a thin ferromagnetic layer which is patterned to form the saturable side shield 26.

FIG. 3 illustrates an embodiment of the present invention utilizing an MR element 40 which connects two portions of the read pole 16. The MR element 40 rests on a planarized $Al_2O_3$ layer. As in the embodiment of FIG. 1 write coils 42 are provided. The MR element 40 is typically a thin film of NiFe. A bismuth MR element will also work with a geometry similar to that in FIG. 1. The configuration of pole 12 spaced away from the MR element reduces unwanted flux leakage from pole 16 into pole 12 to increase the MR efficiency.

A preferred method of forming a three-pole MR head includes forming a cavity in an alumina base layer, the base layer formed over an ALSIMAG or other substrate; the pole piece is formed entirely over the cavity and also beyond the cavity at least in the neck region and back closure region. Next, alumina is deposited to fill the cavity and is planarized. Thereafter, an MR bias conductor may be formed (unless the bias is to be otherwise supplied). The MR element and its leads are next formed with suitable insulation if needed. P2 is next formed, preferably laminated.

Figure 4:
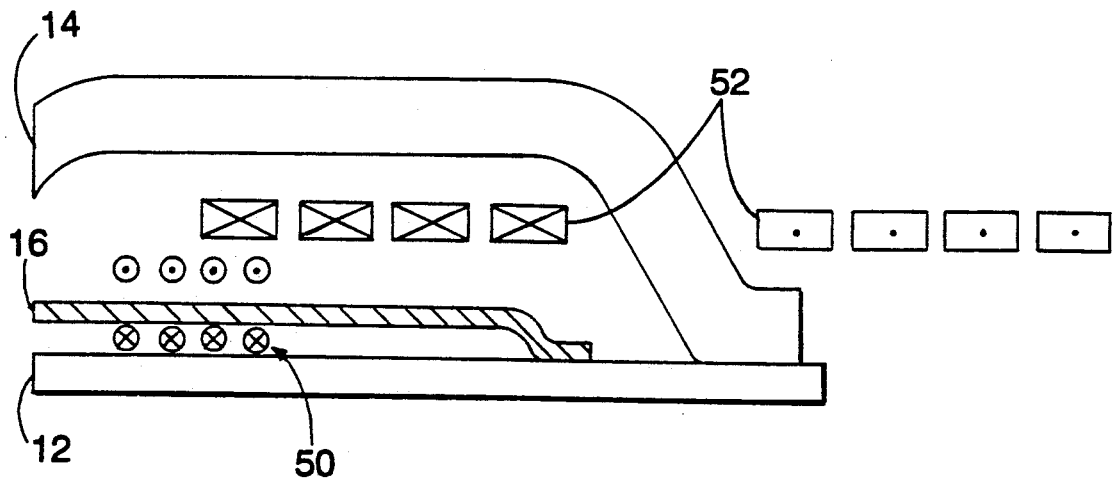
FIG. 4 is a cross-sectional view of the invention employing an inductive coil as a flux sensor.

FIG. 4 shows an embodiment of the invention using an inductive coil 50 surrounding the read pole 16. Writing is effected by means of a write coil 52.

Note that in each of the embodiments, the flux sensor, whether it be the Hall element 22 of FIG. 1, the MR element 40 of FIG. 3 or the inductive coil 50 of FIG. 4, is located away from the gap between the read and write poles. The remote location of the flux sensor provides important design freedom so that performance can be optimized. For example, corrosion and thermal effects can be avoided. The geometric constraints to track width and sensor dimensions imposed by a sense element in the gap are also overcome.

During readback the read pole 16 conducts flux from the media to the attached flux sensor. The write poles 12 and 14 serve as shields to keep the read flux out of the read pole 16 until the source (recorded bit) is almost directly under the read pole 16. This configuration gives a narrow readback pulse and thus allows for higher recording density (more bits per inch). The thin laminated films associated with all three poles allow for a transversely oriented domain pattern and flux conduction by rotation even for very narrow track widths. During write, the write coil 25 drives flux from the pole 12 to the pole 14 and saturates the read pole 16 so that it acts as if it were not there. The effective write gap is therefore the pole 12 to pole 14 distance whereas the effective read gap distance is about half that. Therefore, one can obtain good overwrite from the high write field while at the same time getting good resolution during readback from the effectively smaller read gap. The side shields 26 saturate during write so that they act as if they are not there. During readback, they shield the pole 16 from offtrack sources of flux. The width of the read pole 16 can be made less than the width of the write poles 12 and 14 so that the head writes wide and reads narrow to allow for tracking errors.

Because of the remote location of the flux sensor in the invention, there is a great deal of freedom in the sensor geometry configuration. Furthermore, the three-pole arrangement gives a very focused readback capability. The present design also results in much less signal processing induced noise. The three-pole head performs a differentiation step in the hardware unlike the situation with two-pole heads.

Furthermore, in practice of the present invention, in a magnetic three pole head with a sensor spaced away from the gap, the read pole adapted to conduct flux to the sensor, each write pole forming a respective spacing between itself and the read pole, the active portion of the sensor can be formed upon the second spacing. The poles, at least in the middle of the head, can thus be separated from the sensor and read pole to minimize flux shunting. Alternatively, the active portion of the sensor can be formed over the first pole, and, at least in an area of the head where pole proximity would cause flux to by-pass the sensor, the poles can be configured separated from the read pole to minimize flux shunting. The sensor could be MR, Hall, or inductive.

Other embodiments are within the following claims.

What is claimed is:

1. A magnetic recording head comprising a pair of write poles which extend in spaced relationship from a yoke region to a corresponding pair of tips that are separated by a gap, a read pole disposed in said gap, a sensor spaced away from the gap toward said yoke region, the read pole being adapted to conduct flux to the sensor, and at least one of said write poles being configured so that the spacing between said write poles at their tips is less than the spacing between said write poles nearer to said sensor to provide a narrow track definition.

2. The head of claim 1 further comprising a write coil disposed between said write poles.

3. The head of claim 1 wherein said at least one write pole is bowed.

4. The head of claim 1 wherein a portion of the sensor is disposed between said read pole and one of said write poles.

5. The head of claim 1 wherein said sensor comprises a magneto-resistive (MR) element.

6. The head of claim 1 wherein the sensor is a Hall sensor.

7. The head of claim 1 wherein the sensor is an inductive coil.

8. A device for reading flux from magnetically stored data, comprising a magnetic head having a yoke region tapering to a tip region, at least a first magnetic structure and a second magnetic structure extending in spaced relationship from the yoke region to the tip region, the spacing at the tip region being narrower that the spacing toward the yoke region, a first one of the magnetic structures serving as a read pole and having a slot formed therein in said yoke region, and a sensor coupled to the read pole adjacent to the slot whereby, in use, the sensor senses flux from the stored data as the flux passes from the read pole tip region to the read pole yoke region past the slot, surfaces of the read pole that define the slot being tapered to meet the sensor.

9. The head of claim 8 wherein the second magnetic structure is a second pole, and further comprising an insulation substrate which includes a surface that defines a recessed contour, and the second pole being disposed over said surface and having a configuration that generally follows said recessed contour.

10. The head of claim 8 wherein the second structure is a magnetic pole and further comprising a third magnetic pole that extends from said yoke region to said tip region, said third pole being spaced from said second pole by a greater distance in the region of the slot than in said tip region, the second and third poles being coupled together in the yoke region, and the sensor being a magneto-resistive (MR) element.

11. A device for reading flux from magnetically stored data comprising a magnetic head having a yoke region tapering to a tip region, at least a first magnetic structure and a second magnetic structure extending in spaced relationship from the yoke region to the tip region, the spacing at the tip region being narrower than the spacing toward the yoke region, a first one of the magnetic structures serving as a read pole, a sensor coupled to the read pole, and an insulation substrate having a surface that defines a recessed contour, said read pole being disposed over the surface and having a configuration that generally follows said recessed contour.

12. The head of claim 11 wherein the sensor is a magneto-resistive (MR) element.

13. The head of claim 12 wherein the read pole has a slot formed therein in the yoke region, surfaces of the read pole that define the slot being tapered to meet the sensor.

14. The head of claim 13 wherein the second magnetic structure is a second pole, and further comprising a third magnetic pole that extends from said yoke region to said tip region, said third pole being spaced from said and second pole by a greater distance in the region of the slot than in said tip region, the second and third pole being coupled together in the yoke region.

* * * * *